Jan. 11, 1966       E. WALTZ       3,228,578
SHEET CUTTING AND DISPENSING DEVICE HAVING MEANS TO STRIP
CUT SHEET MATERIAL FROM THE CUTTING MECHANISM
Filed May 28, 1964                                  4 Sheets-Sheet 1
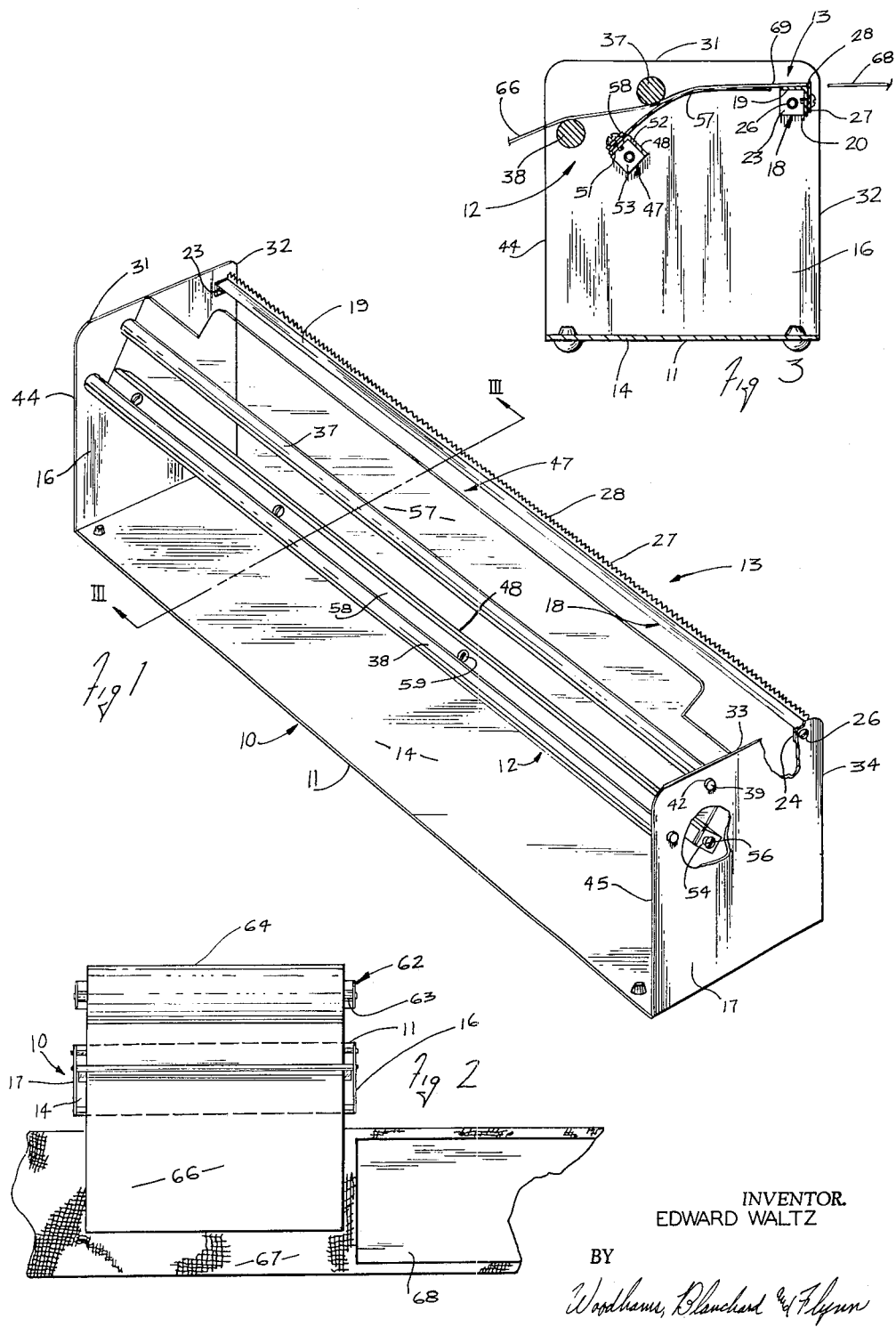
INVENTOR.
EDWARD WALTZ
BY
Woodhams, Blanchard & Flynn
ATTORNEYS

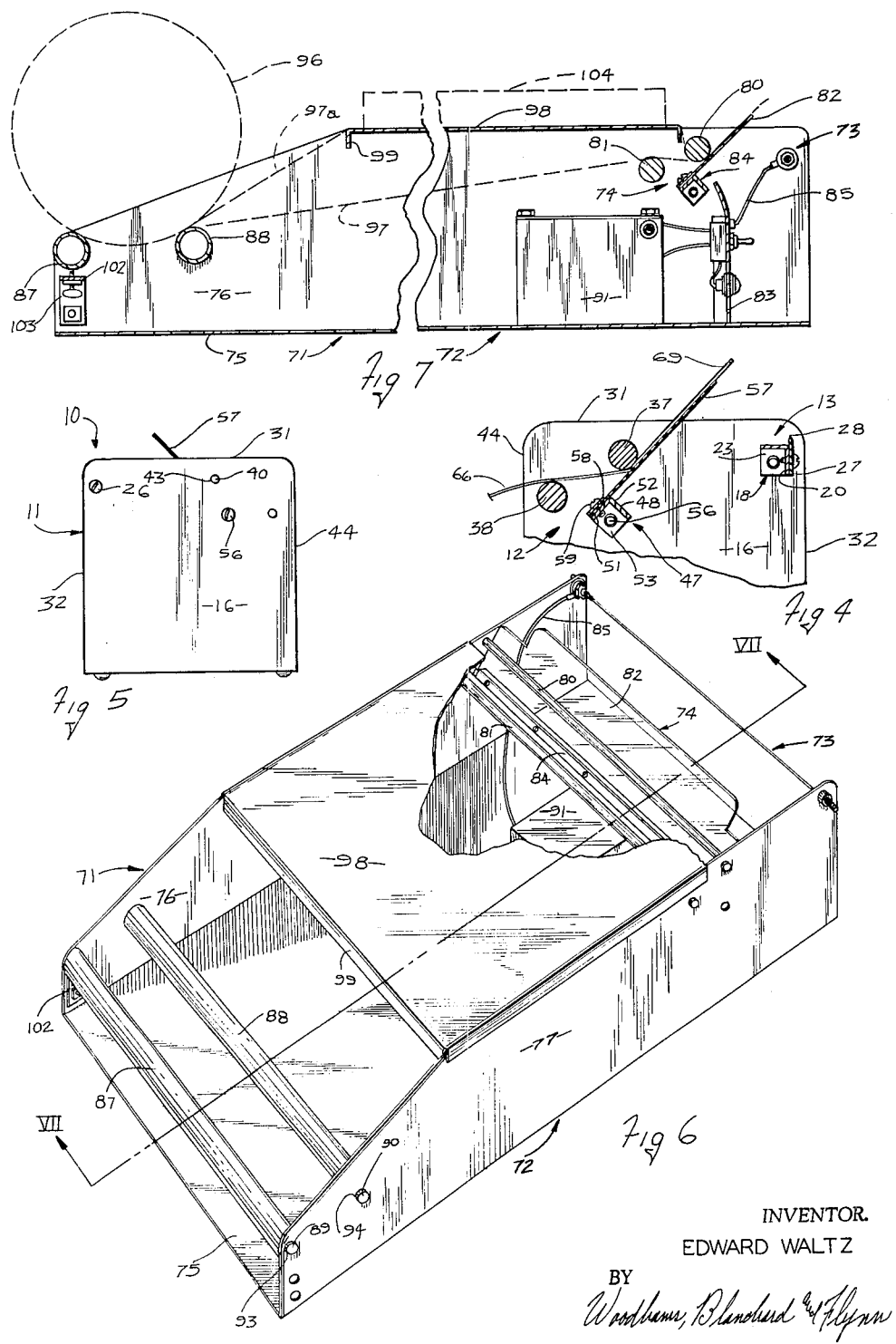

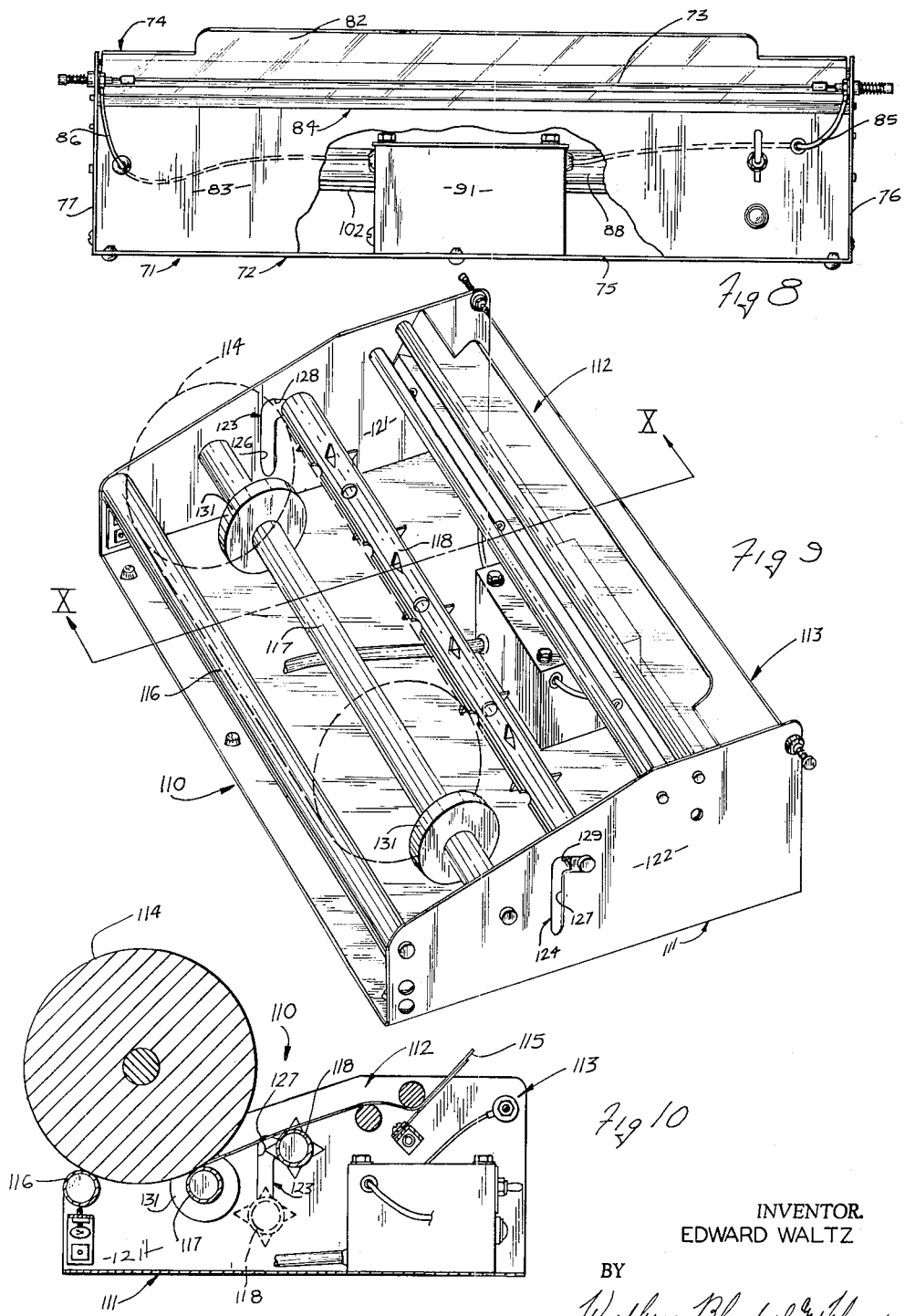

INVENTOR.
EDWARD WALTZ
BY
Woodhams, Blanchard & Flynn
ATTORNEYS

United States Patent Office 3,228,578
Patented Jan. 11, 1966

3,228,578
SHEET CUTTING AND DISPENSING DEVICE HAVING MEANS TO STRIP CUT SHEET MATERIAL FROM THE CUTTING MECHANISM
Edward Waltz, Grand Rapids, Mich., assignor to E. O. Bulman Manufacturing Company, Inc., Grand Rapids, Mich., a corporation of Michigan
Filed May 28, 1964, Ser. No. 371,031
Claims priority, application Canada, Sept. 27, 1963, 885,544
4 Claims. (Cl. 225—21)

This application is a continuation-in-part of my co-pending application Serial No. 228,651, filed October 5, 1962.

This invention relates in general to a device for dispensing sheet material from a supply thereof and, more particularly, to a dispensing device of this character which is especially designed for guiding the movement of a strip of material, such as film or foil, from a roll thereof and for severing a portion of the strip from the roll.

Various types of devices have been widely and successfully used for many years to dispense sheet materials, such as paper, from a roll thereof. One such device is disclosed in U.S. Patent No. 2,234,818, issued to Elvah O. Bulman. However, it has been found that many moisture-proof sheets, such as plastic films and metallic foils, which can be advantageously used in wrapping operations, are not properly handled by existing dispensing devices. More specifically, most of the cutting and guiding mechanisms on present dispensing devices were originally designed for handling paper. Accordingly, the use of films and foils has often been made inconvenient and has sometimes been curtailed for the lack of a dispenser having a satisfactory cutting and guiding mechanism. Where the sheet materials have been laminated and/or reinforced with threads, such as glass fibers, of high tensile strength, the existing dispensers have been virtually useless.

In the course of considering this problem, it developed that a completely new approach would be required for producing a satisfactory cutting and guiding mechanism and that little improvement could be expected from merely reworking the existing mechanisms presently used to handle the weaker materials. That is, whereas existing devices for supporting a roll of paper, incident to dispensing thereof, can be satisfactorily used to support rolls of film or foil, or various combinations thereof with other materials, the existing guiding and severing mechanisms associated with such devices have not as yet been satisfactorily modified for cutting films and foils.

It was also found that the various types of film, foil and reinforced sheets often require different types of cutting edges to produce a satisfactory severance of the material from a roll thereof. For best results, a cutting mechanism having the proper cutting edge should be available for quick attachment to the dispensing device and should be easy to use with its corresponding material. However, it has been found that existing dispensing devices are infrequently adapted for such versatility and, therefore, even if their cutting mechanisms are capable of satisfactory performance with one type of film or foil, they are often unsatisfactory for other types.

Stripping of the cut edge of the sheet material away from the cutting mechanism for easy and safe, manual engagement has also become a serious problem, particularly where films are involved, because there is an inherent tendency for films to cling to the frame and/or cutting mechanism on the existing dispensers of films. Some attempts have been made in the past to overcome this problem. The present invention was conceived in a continuing effort to provide a further solution of this problem.

Under some circumstances, it is at least desirable, if not necessary to wrap certain types of articles with materials through which air can pass rather freely. This requirement has created a serious problem where moisture-proof films are being used, particularly if the film has been intentionally selected so that other articles can be wrapped in an air-tight package. To meet this problem, it has been necessary to perforate the film for certain uses. Existing devices for effecting such perforation have not been especially convenient.

In addition to solving the above problems, the dispensing device of the invention has been designed so that it can be easily adapted to a variety of different uses. That is, the invention may be applied to dispensing devices used in a package wrapping department, or along a production line, or at a check-out station in a retail store.

Accordingly, a primary object of this invention has been the provision of a device for receiving a strip of sheet material, such as film or foil, from a roll thereof supported adjacent to or upon the device, and for severing a portion of such material from the strip thereof neatly, easily, accurately and without damaging in any way the severed portion or the remainder of the material from which said portion was severed.

A further object of this invention has been the provision of a dispensing device, as aforesaid, which has a sheet guiding mechanism adapted to handle a variety of sheet materials with equal efficiency, and which has a severing mechanism capable of handling different sheet materials without substantial modification, if any, in such dispensing device.

A further object of this invention has been the provision of a dispensing device, as aforesaid, which is capable of supporting the roll of sheet material, and which can be adapted to support an article to be wrapped in the sheet material dispensed by the device.

A further object of this invention has been the provision of a dispensing device, as aforesaid, which is inexpensive to produce, which is easy to install, which is simple and safe to operate, which requires little or no maintenance, and which has a pleasing appearance.

Other objects and purposes of this invention will become apparent to persons familiar with this type of equipment upon reading the following descriptive material and examining the accompanying drawings, in which:

FIGURE 1 is a perspective view of a dispensing device including a guiding mechanism embodying the invention.

FIGURE 2 is a top plan view of the dispensing device of FIGURE 1 in combination with a roll support and a conveyor.

FIGURE 3 is an enlarged sectional view taken along the line III—III in FIGURE 1.

FIGURE 4 is a fragment of FIGURE 3.

FIGURE 5 is a side view of said dispensing device as viewed from the opposite side appearing in FGURE 1.

FIGURE 6 is a broken perspective view of a modified dispenser embodying the invention.

FIGURE 7 is a broken sectional view taken along the line VII—VII in FIGURE 6.

FIGURE 8 is a broken, rear-end view of the dispensing device shown in FIGURE 6.

FIGURE 9 is a perspective view of another modified dispenser embodying the invention.

FIGURE 10 is a sectional view taken along the line X—X in FIGURE 9.

Figure 11:
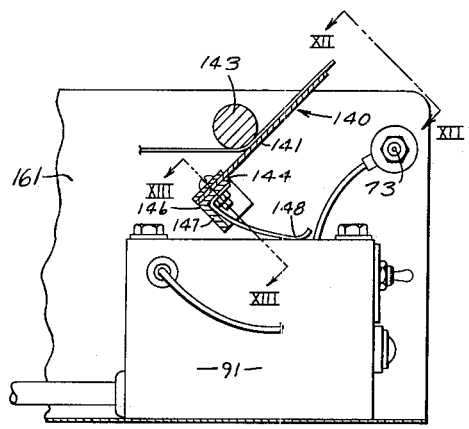
FIGURE 11 is a view corresponding to a fragment of FIGURE 10 and showing yet another modified dispenser embodying the invention.

For convenience in description, the terms "upper," "lower," "front," "rear" and terms of similar import will have reference to the dispensing device of the invention in its normal position of operation and as appearing in FIGURES 1, 6 and 9. The terms "inner," "outer" and derivatives thereof will have reference to the geometric center of said dispensing apparatus and parts thereof.

General description

The objects and purposes of the invention, including those set forth above, have been met by providing a device for receiving a strip of sheet material from a supply, such as a roll, thereof and for guiding and/or controlling the movement of the strip from the roll to a mechanism for severing a piece of the strip from the roll. The guiding mechanism includes a flat, flexible member over which the strip of material passes and which moves the cut edge of the strip away from the severing mechanism, after a severing operation is performed.

In a modified embodiment, the frame of the dispensing device is enlarged to provide support for a roll of the sheet material and to provide a platform upon which articles can be wrapped in the sheet material severed from the roll thereof. The roll-supporting structure includes a pair of spaced and parallel rollers at one end of the frame. In a further modification of the invention, the dispensing device includes roll-supporting structure and means which is movable into and out of position for perforating the sheet material. In yet another modification of the invention, the guiding mechanism includes a rigid, pivotally mounted plate which is spring urged into an upward position. The strip of material passes over the plate and the plate moves the cut edge of the strip away from the severing mechanism after a severing operation is performed.

Detailed construction

The dispensing device 10 (FIGURES 1 and 2), which has been selected to illustrate one embodiment of the invention, is comprised of a frame structure 11, a guide mechanism 12 and a cutting member or mechanism 13. In one particular embodiment of the invention, as shown in FIGURE 1, the frame structure 11 is substantially rectangular in shape and includes a base plate 14 and a pair of parallel end plates 16 and 17, which are rigidly secured to and extend perpendicularly away from the opposite ends of the base plate 14.

The cutting member 13 (FIGURES 1 and 3) includes an elongated substantially rigid angle member 18 having a pair of perpendicularly disposed lengthwise flanges 19 and 20. The opposite ends of the side flange 20 (FIGURE 3) are bent over to form a pair of end flanges 23 and 24 (FIGURE 1), which are secured to the end plates 16 and 17, respectively, by means such as the screws 26. Accordingly, by loosening the screws 26, the angle member 18 can be adjusted around its lengthwise axis.

An elongated, flat and substantially rigid blade 27 is secured to and upon the outer surface of the side flange 20 so that the cutting edge 28 of said blade, which is serrated in this particular embodiment, extends slightly above or beyond the adjacent surface of the top flange 19. The cutting member 13 extends between the corners of the end plates 16 and 17 defined by their upper and rearward edges 31, 32 and 33, 34, respectively.

The guide mechanism 12 includes upper and lower guide rollers 37 and 38 (FIGURES 1 and 3) which are rotatably supported in spaced parallel relationship upon and between the end plates 16 and 17. More specifically, the upper guide roller 37 has end portions 39 and 40 (FIGURES 1 and 5) which are of reduced diameter and are rotatably disposed within the openings 42 and 43 in the end plates 16 and 17, respectively. The lower roller 38 has similar end portions of reduced diameter which extend through corresponding openings in said end plates 16 and 17. The guide rollers 37 and 38 are located near the corners of the end plates 16 and 17 defined by the upper edges 31 and 33 thereof and the front edges 44 and 45 thereof. The upper guide roller 37 is substantially closer to the upper edges of the side plates than to the front edges of the side plates and the lower roller 38 is substantially closer to the front edges of the side plates than to the upper edges thereof.

The guide mechanism 12 also includes an adjustable sheet guide 47 which extends perpendicularly between and is supported upon the end plates 16 and 17, and it is located between the cutting member 13 and the guide rollers 37 and 38. That is, said sheet guide 47 extends upwardly and rearwardly from a line below the upper guide roller 37. The sheet guide 47 (FIGURES 1 and 3) includes an elongated and substantially rigid support element 48 which may be similar in construction and shape to the angle member 18. That is, the element 48 has a pair of perpendicularly disposed, lengthwise flanges 51 and 52, one of which is bent over at its opposite ends to provide end flanges 53 and 54 (FIGURES 1 and 3) which are adjustably secured to the opposing surfaces of the end plates 16 and 17 by the screws 56. Accordingly, the position of the element 48 around its lengthwise axis can be adjusted by loosening the screws 56, rotating said element 48 and thereafter tightening the screws.

A thin, elongated and substantially flat guide member 57, which is fabricated from resiliently flexible material, such as plastic, fiberglass or metal, is secured along one edge thereof upon the flange 51, which is near to but spaced from the lower guide roller 38. The guide member 57 is here shown as being transparent, which is desirable, but it can be translucent or opaque if desired. In this particular embodiment, the guide member 57 is secured upon said flange 51 by an elongated metal strip 58, which is preferably about as long as the side flange 51, and by the rivets 59. The guide member 57 is preferably of such width that its free edge extends almost to, but does not touch, the adjacent edge of the top flange 19 on the angle member 18, when the guide member 57 is bent toward said angle member 18 (FIGURE 3). Under normal circumstances, the support element 48 is positioned, as appearing in FIGURE 4, so that the guide member 57 bears snugly against the upper guide roller 37, which is almost directly above the support element 48. The amount of pressure between the guide member 57 and the upper roller 37 can be adjusted by rotating the support element 48 in one rotational direction or the other around its lengthwise axis.

As shown in FIGURE 2, the dispensing device 10 can be employed in conjunction with a substantially conventional rack 62 having a shaft 63 for rotatably supporting a roll 64 of sheet material 66, such as moistureproof film, foil, paper or the like. Moreover, the dispensing device 10 and the rack 62 can be used in conjunction with a conveyor 67 upon which the pieces 68 of sheet material 66 are placed after they are severed from the roll thereof.

Operation

In using the dispensing device 10, a companion unit, such as the rack 62 (FIGURE 2) is normally required to support the roll 64 of sheet material, which is fed through the dispensing device. As shown in FIGURE 4, the sheet material 66 may be fed over the lower guide roller 38 and then under the upper guide roller 37 so that it is resiliently pressed against the upper guide roller by the resiliently flexible guide member 57. Normally, the guide member 57 will be in its FIGURE 4 position, thereby holding the edge 69 of the sheet material 66 upwardly away from the cutting edge 28 on the blade 27. This serves to minimize injury to the hand of the operator, who must grasp the free edge 69 of the sheet material 66 to initiate a dispensing operation.

When it becomes desirable to remove a piece 68 of sheet material from the roll 64 thereof, the free edge 69 of the sheet material is manually engaged and pulled rearwardly away from the guide mechanism 12 beyond, and rearwardly of, the cutting edge 28. When the proper amount of sheet material extends beyond the cutting edge 28, the sheet material is moved downwardly so that it engages the cutting edge 28, whereby the piece is severed from the remainder of the roll. The guide member 57 is bent downwardly (FIGURE 3) during the downward movement of the sheet material toward the cutting edge 28. The resistance of the guide member 57 to such downward movement is relatively small. However, when the severing operation is completed, the guide member 57 promptly moves upwardly from its FIGURE 3 position into its FIGURE 4 position, thereby moving the edge 69 of the sheet material 66 away from said blade 27. The engagement of the sheet material 66 between the guide member 57 and upper guide roller 37 prevents the sheet material 66 from slipping frontwardly through the guide mechanism 12 and, therefore, holds the free edge 69 of the sheet material 66 in a position where it can be quickly and easily grasped to commence another dispensing operation.

Under some circumstances, particularly where the sheet material is removed from the top of the roll, it may be desirable to feed the sheet material beneath both of the guide rollers 37 and 38. However, the operation of the sheet guide 47 will not be altered by this change in feeding.

*Alternate structure*

The modified dispensing device 71 (FIGURES 6 and 7) includes a frame structure 72 which supports near one end thereof a severing member 73 and a guide mechanism 74. The frame structure 72 includes an elongated base plate 75 and a pair of upstanding, parallel and integral side plates 76 and 77, which extend upwardly from the lengthwise edges of the base plate. The guide mechanism 74 includes an upper guide roller 80, a lower guide roller 81 and a sheet guide 82 which are preferably similar in construction and relative locations to the guide rollers 37 and 38 and the sheet guide 47 of the dispensing device 10.

A partition 83 (FIGURES 7 and 8), which is mounted within the frame structure 72, extends between the side plates 76 and 77 and upwardly from the base plate 75, so that the upper edge of said partition is horizontally aligned with and near to the support element 84 of the sheet guide 82. The partition 83 serves not only to strengthen the frame structure 72, but also to block access to the space within the frame structure 72 frontwardly of the guide mechanism 74.

The severing member 73 is, in this particular embodiment, a wire element which is heated in a conventional manner for the purpose of severing film. However, a cutting member, such as that indicated at 13 in the dispensing device 10, can be used in place of the heated wire member 73. The severing member 73 may be electrically connected by the conductors 85 and 86 to a transformer 91 which is connected to a standard source of 110 volt electrical potential.

A pair of spaced and parallel rollers 87 and 88 are supported upon and extend between the side plates 76 and 77 near the front ends thereof. The rollers 87 and 88 have reduced end portions, two of which are indicated at 89 and 90 (FIGURE 6), which are slidably and rotatably received through appropriate openings, such as the openings 93 and 94, in the side plates 76 and 77. As shown in FIGURE 7, the rollers 87 and 88 are arranged to support a roll 96 of sheet material 97, such as film, foil or paper.

A flat shelf member 98, which is preferably rectangular in shape, is supported upon the upper edges of the side plates 76 and 77 and extends therebetween substantially parallel with the base plate 75. The shelf member 98 has a downwardly extending flange 99 extending along its edge for strength purposes and for positioning said shelf member upon the side plates. A brace bar 102 is secured to and extends between the side plates 76 and 77 directly beneath and spaced from the front roller 87. A thumb screw 103 is threadedly received upwardly through the brace bar 102 for engagement with the front roller 87 to control or brake its rotational movement, and thereby prevent overrunning of the roll 96 of sheet material during an unwinding operation.

The operation of the dispensing device 71, insofar as the guiding of the sheet material by the guide mechanism 74 and the severing of the sheet material by the severing member 73 are concerned, may be substantially the same as discussed above with respect to the dispensing device 10. That is, with the roll 96 supported upon the rollers 87 and 88, the sheet material 97 is threaded from the roll beneath the shelf member 98, over the lower guide roller 81 and beneath the upper guide roller 80 so that the sheet material is pressed by the sheet guide 82 against the upper guide roller 80. When a piece of the sheet material 97 is required, the free end of the sheet material adjacent the sheet guide 82 is manually engaged and pulled away from the sheet guide 82 over the severing member 73 until the right amount of such material is withdrawn. Then the material is moved downwardly so that it engages the severing member 73 and is thereby separated from the remainder of the roll. The resiliently flexible sheet guide 82 moves the severed edge of the sheet material on the roll away from the severing member so that the operation can be immediately and safely repeated.

The sheet material 97 can be moved away from the guide mechanism 74 beneath the severing member 73 so that the severing operation is performed by moving the sheet material upwardly. This arrangement may be particularly convenient where the severed piece of material is placed upon the shelf member 98 for the purpose of wrapping a package indicated in broken lines at 104 in FIGURE 7.

In an alternate operation of the dispensing device 71, the sheet material may be threaded, as indicated in FIGURE 7, by the broken line 97a, over the shelf member 98, under the upper guide roller 80 and thence over the sheet guide 82.

FIGURES 9 and 10 illustrate a modified dispensing device 110 having a frame structure 111 which is similar to, but somewhat shorter than, the frame structure 72. The guide mechanism 112 and severing member 113 may be identical with the corresponding parts 73 and 74, respectively, in the dispensing device 71. Likewise, a roll 114 of film 115, for example, is supported upon the frame structure 111 by a pair of spaced and parallel rollers 116 and 117.

A perforating roller 118 is adjustably and rotatably supported upon and between the side plates 121 and 122 of the frame structure 111, so that said roller 118 is movable into and out of a position parallel with and near to the roller 117. That is, the side plates 121 and 122 have similar, opposing slots 123 and 124 which are substantially L-shaped. Said slots 123 and 124 have vertical legs 126 and 127, respectively, and sloping legs 128 and 129 which decline rearwardly from the upper ends of the vertical legs 126 and 127, respectively. The opposite ends of the roller 118 extend through and are movable along the slots 123 and 124. The roller 118 has integral barbs or pins which are capable of perforating a film which is passed over the barbs. The roller is inoperative when it is at the lower ends of the vertical legs 126 and 127. The roller is moved upwardly and then rearwardly into the sloping legs 128 and 129 where it can produce said perforations in the film 116. The rings 131 on the roller 117 prevent excessive axial movement of the roll 114.

Figure 12:
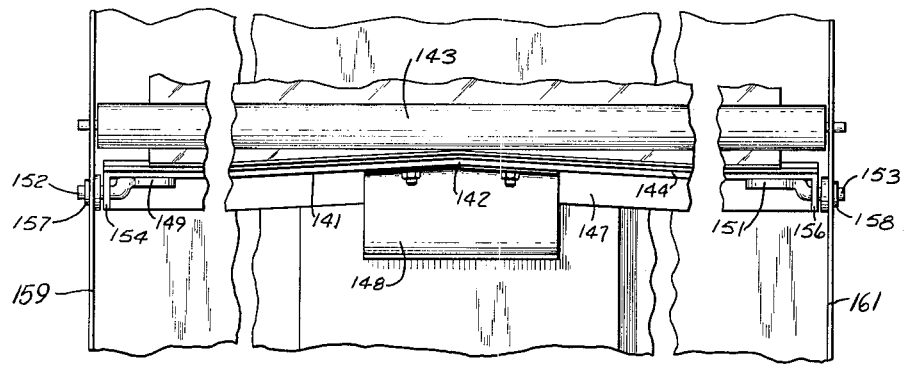
FIGURE 12 is a broken view of the structure shown in FIGURE 11 looking in the direction of the arrows XII—XII.
Figure 13:
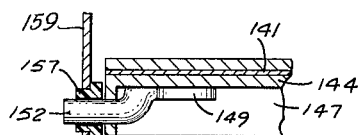
FIGURE 13 is a sectional view taken on the line XIII—XIII in FIGURE 11.

FIGURES 11, 12 and 13 illustrate yet another modification employing a modified guide mechanism 140. The remainder of the dispensing device can be the same as in the previously described embodiments of the invention. The guide mechanism 140 is comprised of a thin, elongated, flat and substantially rigid guide member 141 which can be made of metal. The guide member 141 is inclined upwardly from its ends toward the center 142 thereof so that the film is gripped between the highest part of said guide member and the guide roller 143 after a severing operation is completed. This minimizes backward slipping of film. The guide member 141 is secured along one edge thereof to one flange 144 of a rigid support element 146. The support element 146 has a downwardly extending flange 147. A leaf spring 148 is secured to the lower surface of the guide member 141 adjacent said one edge thereof and it extends into contact with the flange 147 and then extends rearwardly and downwardly into contact with the top wall of the transformer 91. The mounting flanges 149 and 151 of the coaxial pivot pins 152 and 153 are affixed to the flange 144 near the opposite ends thereof in any suitable manner, such as by welding. The pivot pins 152 and 153 extend through openings in the end walls 154 and 156 of the support element 146 and thence extend into openings in the sleeve bearings 157 and 158 which are mounted in the end plates 159 and 161 of the frame structure. The sleeve bearings 157 and 158 preferably are made of a self-lubricating material, such as nylon, and they engage and support the pivot pins 152 and 153 somewhat loosely so as to assure a firm engagement between the guide member 141 and the guide roller 143. Thus the support element 146 and the guide member 141 are supported for pivotal movement about the common axis of the pivot pins 152 and 153 and are normally urged into an upward position in which the center 142 of the guide member 141 is urged against the guide roller 143.

The operation of this modification will be largely the same as in the previously described embodiments. The free end of the film is manually engaged and pulled away from the sheet guide 140 over the severing member 73 until the desired length has been unrolled. The film is pulled down, which also pivots the guide member 140 downwardly, and then is separated from the remainder of the roll by the severing member 73. The guide mechanism 140 then pivots upwardly so that the film is gripped between the center 142 of guide member 141 and the guide roller 143 is in readiness for the next unrolling operation.

Although particular preferred embodiments of the invention have been disclosed above in detail for illustrative purposes, it will be understood that variations or modifications of such structure, which come within the scope of the appended claims, are fully contemplated.

What is claimed is:

1. A device for supporting a roll of sheet material and for severing a piece of the material from the roll thereof, comprising:
   frame structure including means for supporting said roll of sheet material for rotation around the central axis of said roll;
   severing means including a severing edge substantially spaced from and parallel with said central axis when said roll is on said support means;
   an elongated guide element mounted upon said frame structure between said support means and said severing means, said guide element being spaced from and substantially parallel with said severing edge;
   an elongated, substantially flat and rigid guide member extending lengthwise of said guide element and being supported upon said frame structure for pivotal movement around a lengthwise axis below said plane, said guide member normally extending upwardly through said plane in a position between said guide element and said severing edge, said guide member having a pair of substantially adjacent portions converging with said guide element lengthwise thereof and toward the central portion thereof; and
   resilient means urging said guide member toward said guide element so that said central portion only of said guide element is normally engaged by said guide member whereby said sheet material can be threaded and snugly engaged between said guide member and said guide element.

2. A device according to claim 1, in which said guide member has pivot pins at the opposite ends of said pivot axis and sleeve bearing mounted on said frame structure and loosely engaging said pivot pins so that said guide member can move into proper alignment with said guide element.

3. A device according to claim 1, wherein said guide element is at substantially the same horizontal level as the severing edge; and
   wherein said adjacent portions substantially meet at the transverse centerline of said guide member, one of said portions being disposed at a small acute angle to the plane defined by the adjacent part of the other portion.

4. A device for guiding and severing a piece of sheet material from a web thereof, comprising:
   a frame including a pair of spaced-apart end plates;
   a cutting member mounted on and extending between said end plates at the forward end thereof, said cutting member having a substantially horizontal cutting edge located adjacent the upper edges of said end plates;
   an elongated guide element supported upon and extending between the end plates adjacent the upper edges of said end plates, said guide element being located in substantially the same horizontal plane as said cutting edge and being spaced horizontally therefrom, the lengthwise axis of said guide element being substantially parallel with said cutting edge;
   a sheet guide extending between said end plates, said sheet guide being pivotally mounted on said end plates at points below said plane, said sheet guide including a flat, elongated and substantially rigid guide member normally extending upwardly and forwardly from below said guide element through said plane in a position between said cutting member and said guide element;
   resilient means urging said guide member into said position and against said guide element, said guide member being forcibly movable downwardly into a substantialy horizontal position wherein its free end extends close to said cutting member, said sheet material being threaded upwardly and held firmly between said guide element and said guide member when said guide member is in said upwardly extending position, said guide member being pivoted downwardly by a force applied thereto by said material when the end portion of said material is moved forwardly over and beyond said cutting member so that a piece of the material can be cut from the remainder of the web, whereupon the guide member will return to its upwardly extending position to hold the web against the guide element in readiness for the next cutting operation.

References Cited by the Examiner

UNITED STATES PATENTS

| | | | |
|---|---|---|---|
| 2,344,340 | 3/1944 | Adams | 225—21 X |
| 2,470,250 | 5/1949 | Kienle | 225—80 X |
| 2,650,433 | 9/1953 | Kruger | 225—21 X |
| 2,751,163 | 6/1956 | Waltz | 225—54 X |
| 2,839,140 | 6/1958 | Vogt | 225—90 X |
| 2,954,910 | 10/1960 | Moncrieff | 225—85 X |

WILLIAM W. DYER, Jr., *Primary Examiner.*

ANDREW R. JUHASZ, *Examiner.*